Nov. 24, 1970  E. A. SABEL  3,541,674
METHOD FOR MAKING AN INTERNALLY REINFORCED CRUSHING ELEMENT
Original Filed Oct. 13, 1966  2 Sheets-Sheet 1

INVENTOR.
Erik Arne Sabel,
BY Parker & Carter
Attorneys.

INVENTOR.
Erik Arne Sabel,
BY Parker & Carter
Attorneys.

United States Patent Office 3,541,674
Patented Nov. 24, 1970

3,541,674
METHOD FOR MAKING AN INTERNALLY
REINFORCED CRUSHING ELEMENT
Erik Arne Sabel, Box 128,
Ojebyn, Sweden
Original application Oct. 13, 1966, Ser. No. 586,413, now
Patent No. 3,473,746, dated Oct. 21, 1969. Divided and
this application Apr. 26, 1968, Ser. No. 724,437
Claims priority, application Sweden, Jan. 12, 1966,
342/66
Int. Cl. B23p 17/00
U.S. Cl. 29—527.3       6 Claims

ABSTRACT OF THE DISCLOSURE

The present disclosure is related to wear taking bodies or members for mills, for example, for cone or gyratory crushers. The particular structures shown are bowl lines or mantles for use in crushers in which a head is gyrated within a surrounding bowl. The bowl liner is secured to the bowl, and the mantle is mounted on the head. These two wearing parts define a crushing cavity into which material is discharged from above for reduction. It will be understood that the crushing parts, the liner and mantle, take tremendous wear, and wear away rapidly. A major purpose of the disclosure is a wear taking part and a method of making it which permits the use of hard but brittle metals.

---

This application is a division of application Ser. No. 549,678, filed May 12, 1966, now forfeited, and Ser. No. 586,413, filed Oct. 13, 1966, now Pat. No. 3,473,746.

SUMMARY OF THE INVENTION

The choice of materials for such bowl liners and mantles has hitherto been limited, in accepted practice, to metals which have relatively poor wear taking characteristics, but which have a toughness which enables them to stand the crushing stresses without breaking or cracking. Manganese steel has been a generally accepted material for bowl liners and mantles, but, although tough, lacks the hardness of some other materials, and wears at a more rapid rate than is desirable. The hard steels, which have the highest wear resistance, are prevailing brittle, and their brittleness involves the risk of formation of cracks or breaks. This brittleness has constituted a serious obstacle to the utilization of those metals which have the highest wear resistance.

By means of the present invention, the drawback of brittleness has been overcome by using a body formed or poured of a metal of very high resistance to wear. I propose to use a hard and brittle metal which is reinforced or retained by rods or rings of a different metal which may be considered a framework or frame, having great tensile strength and resistance to fracture. Whereas, as a matter of convenience, I talk in terms of a reinforcing structure, it will be realized that it might equally well be described as a retaining or stabilizing structure which becomes effective in the event of cracking or breakage of the brittle metal body.

As will appear below, the protective body, or wearing part, is cast from metals or alloys having originally, or by treatment, a high Brinell hardness. The metal employed is cast about a suitably shaped retaining or stabilizing structure which, as will appear below, is coated with a suitable coating to prevent it from being sintered to or joined directly to the metal of the wearing part. Since the enclosed stabilizing structure is separated by a suitable coating from any sintering to or joinder with the outer brittle metal of the wearing part, and is of a tougher metal, it is not affected by cracking or breakage of the outer brittle body. In the event of such breakage, since there is no clearance between the coating of the inner structure and the abutting mass of the outer structure, cracking or breakage of the outer structure does not result in any separation of the parts of the outer structure. Thus, although a brittle metal bowl liner or mantle may be cracked, the inner retaining structure prevents any damaging separation along the crack or cracks.

BRIEF DESCRIPTION OF THE DRAWINGS

The wearing part may be of various shapes, but I illustrate herein specific examples.

Referring to the drawings.

DESCRIPTION OF THE PREFERRED EMBODIMENT

Like parts are indicated by like symbols throughout the specification and drawings.

The wear body, generally designated 1, comprises a cast cone mantle or liner 2 having embedded therein one or more axially spaced rings 3, 4 and 5, of reinforcing or retaining or positioning elements or rods, such as steel of high tensile strength and resistant to fracture, the rods or rings being of successively greater diameter toward the base of the conical mantle or liner. There is a spacing, separation or nonfusion interface of the cast metal of the cone liner from the rings by a separating layer 5a of a mixture of plastic and sand.

As an example of material for the cone mantle or liner 2, it may be of a casting of pearlitic, carbidic white cast iron, or martensitic, carbidic, chrome-nickel alloyed cast iron, sometimes known as NIHARD. Castings from such metals are known to be brittle and hard, and have good wear characteristics.

Figure 2:
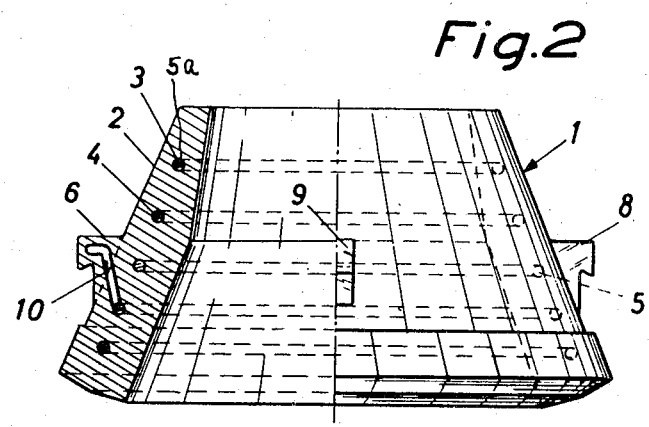
FIG. 2 is a section on the line 2—2 of FIG. 1.

For the mounting of the cone or mantle, hooks or abutments 6, 7, 8 and 9 are provided on the cone liner and each may be reinforced in the manner shown for abutment 6 in FIG. 2, wherein an arm 10 enters the abutment.

Prior to the casting of the cone liner 2 about the rings the latter are annealed, and blasted, pickled and heated in an oven to a temperature of 250° to 300° C. At such temperature the retaining structure is placed in a box more or less filled with a mixture of about 93% sand of fineness No. 110 (American Foundryman Society) and about 7% powdered resin such as phenolformaldehyde molding powder. The box and contents are then rotated and agitated. The heat of the retaining elements softens the resin, which, in turn, causes the sand to adhere and more resin to adhere to the adhered sand which has then become heated. In this manner a layer of mixed sand and resin is built up on the retaining elements ranging from about half a millimeter to about 5 millimeter according to mass of the retaining elements and the duration of agitation, as well as the temperature of the retaining element when it is placed in the box. After the retaining elements are taken from the box they are then baked to a hard crust at about 200° to 400° C.

This crust prevents the cast metal of the cone liner from becoming sintered onto or fused to the retaining structure or reinforcement and may permit relative movement of the cooling and shrinking cone with respect to the retaining structure so that internal stresses due to the presence of the retaining structure are minimized. The hot casting metal which is of a temperature sufficient to partially decompose part of the resin produces an amount of gas to form a film between the casting metal and the bulk of the crust, and so retards further decomposition.

The composite separating layer of at least partially decomposed resin and sand is yieldable enough, in the casting, to allow relative movement of the reinforcement and casting proper. However, when the retaining structure has the brittle outer body cast about it, there is no clearance between the separating layer of the retaining structure and the casting itself.

The rings may be held in spaced relationship within the casting mold by tie members to form a cagelike structure or frame or by radial stays from a central support.

The primary purpose of the above described retaining structure is to maintain the brittle outer body intact. If it cracks, the brittle metal is held together along the faces of the cracks by the retaining structure. If cracking results in a separation into parts, these parts are held against each other as a unitary body by the retaining structure against relative movement.

Figure 3:
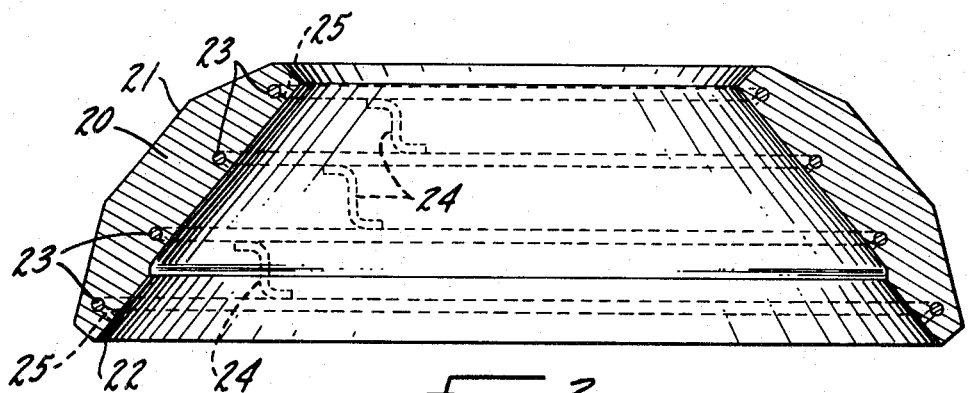
FIG. 3 is an axial section through a mantle to be applied to the head of a gyratory or cone crusher.

With reference to FIG. 3, the wear-taking body, in the form of a mantle for a conic head, is indicated at 20. It has an outer wear-taking surface 21, opposed to the particles to be crushed, and a rear surface 22 adapted to be opposed to the surface of the cone. The retaining structure in the example of FIG. 3 includes four rings 23 of rod material welded to form complete circles. Assuming that the bottom diameter of the mantle thus formed is of the order of 4 feet to 6 feet, it may, for example, be practical to employ rod of ⅝-inch stock, or less. The rods 23 may be connected by intermediate spacers 24 which may conveniently be made of somewhat lighter rod stock. Each spacer may be, for example, in the form shown in FIG. 3, and, in any event, is formed so as to be welded or secured at each end to adjacent rods 23. Enough spacers are employed to provide, in effect, a self-supporting retaining cage of rod stock. In addition, I provide back face spacers 25 which extend to the rear face of the mantle. These back face spacers, when the mantle is poured about the retaining structure or reinforcement, serve to support and center the structure within the space to be filled by the brittle metal of which the mantle is formed.

Figure 1:
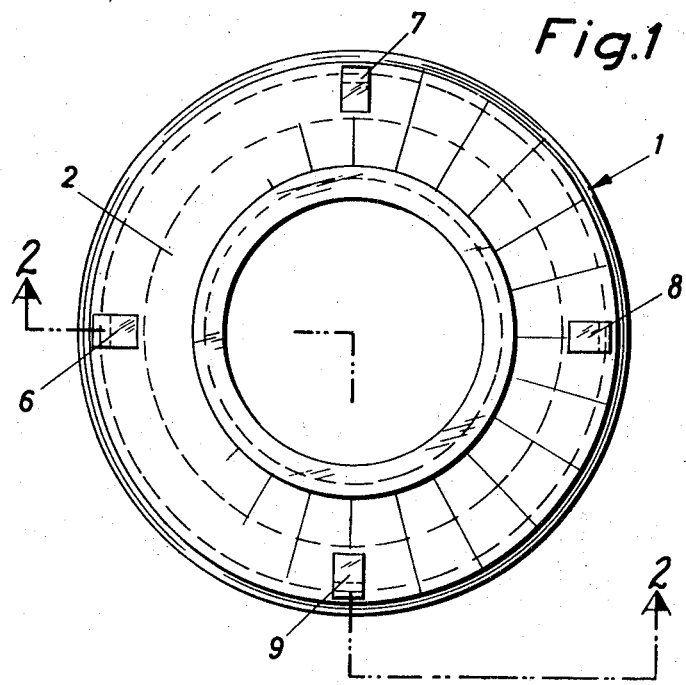
FIG. 1 is a plan view of a bowl liner for a gyratory crusher.

Any suitable mold may be employed. Any suitable rod stock may be employed, but it will be understood that it will be of relatively high tensile strength, and will be resistant to fracture. For example, the range of ultimate tensile strength may be as low as 45,000 lbs./sq. in. or less, and as high as 100,000 lbs./sq. in. or more. When the mantle has been poured about the retaining structure, the result is a mantle of brittle metal circumferentially reinforced, and reinforced from end to end by a reinforcing or retaining structure of greater tensile strength. Actually, the internal structure may not necessarily perform any continuing reinforcing function until cracking takes place. Or, under some circumstances, it may have a reinforcing effect. What I consider of maximum importance is that the retaining structure be always available to prevent cracks from separating and to prevent relative displacement of broken parts. It will be noted that the retaining structure is positioned much closer to the backing face of the mantle than to its working face. This is important, to provide a maximum use or working wear of the mantle body. As described in connection with the form of FIGS. 1 and 2, the retaining structure may be annealed, and blasted, pickled and heated, and covered with a suitable cover of sand and powdered resin. This procedure is described above. The result is a brittle mantle with a relatively high tensile retaining structure or reinforcement, and with no joinder or direct metallic connection or fusion between the mantle body and the reinforcement.

Figure 4:
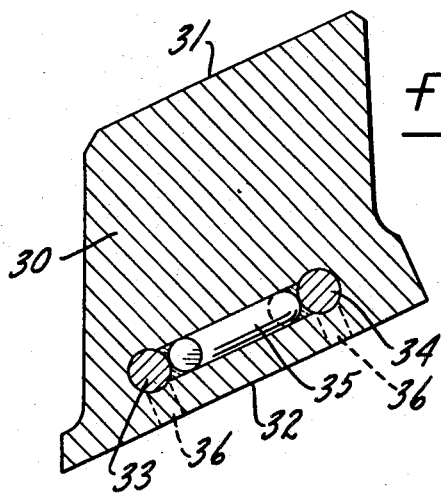
FIG. 4 is a section through a mantle for a crusher having a different shape of head.

FIG. 4 illustrates an equivalent reinforced mantle, but of somewhat different shape. The mantle 30 is shown with an upper working or particle engaging surface 31, and a lower or backing surface 32, opposed to a suitable gyrated head. The retaining structure or reinforcement is shown as including an outer ring 33 and an upper, inner ring 34 connected by spacers 35. As a matter of convenience, the spacers have abutting portions which may be welded to each ring, and a connecting spacer which holds the two rings in predetermined relative position. The rings are, as in the earlier forms of the device, formed of a metal or rod stock having relatively high tensile strength. Back face spacers 36 are also employed, as shown in the form of FIG. 3. Likewise, it will be observed that the retaining structure is close to the backing surface, but remote from the working or particle engaging surface, providing a substantial mass of metal which permits a long life of the mantle. It will be understood, of course, that when the retaining structure is suitably positioned in a suitable mold the brittle metal of the body of the mantle is poured, and embeds the retaining structure without fusion. The back face spacers 36 perform the same function as the back face spacers 25 of FIG. 3, and the retaining structure is properly positioned and centered in the mold for pouring.

Figure 5:
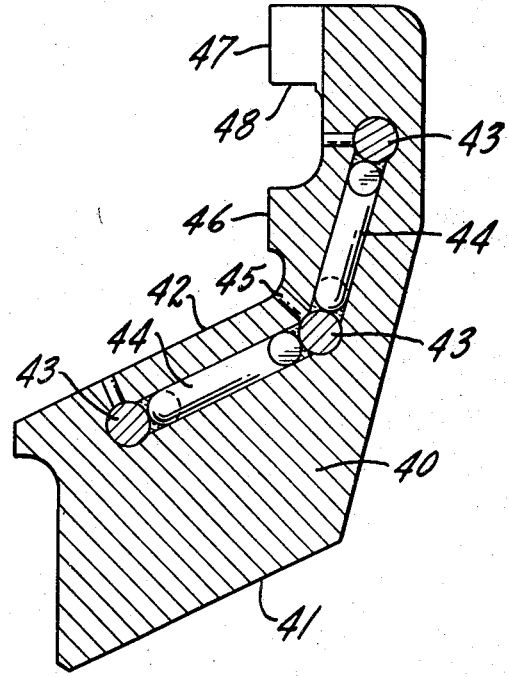
FIG. 5 is a section through a liner.

FIG. 5 indicates a bowl liner for a crusher having a gyrated head with a relatively low angle of slope. The liner 40 has a working or material-engaging surface 41 and a backing face or surface 42. The retaining structure is shown as including three rods 43, formed in closed rings, and connected by suitable spacers 44 which may be welded thereto. Back face spacers 45 are likewise employed. The particular bowl liner shown in FIG. 5 has a circumferential spacing flange 46 and an upper locking or securing flange 47. Any suitable securing members may be positioned to penetrate beneath its lower surface or surfaces 48. However, the securing means do not of themselves form part of the present invention, and are not herein indicated. Actually, what is important in connection with the form of FIG. 5, as of the other forms, is the combination of an inner retaining structure of relatively high tensile strength which extends circumferentially about the wearing part, which includes, preferably, two or more closed rings connected to each other, and which further includes back face spacers to provide for proper centering and support of the retaining structure when the brittle metal mass is poured about it.

It will be realized that many changes may be made in shape, number and disposition of parts. It will also be understood that the specific shaping of wearing parts, including bowl liners and mantles, may be widely varied. The specific shapes do not of themselves form part of my invention.

It will be realized further that a wide variety of materials may be used, but I have described herein metals which are well adapted for the practice of my invention.

It will be understood, of course, that by the term "reinforcement" I wish to include the internal retaining structure above described, in which an outer brittle casting surrounds or is poured about an inner retaining or reinforcing structure of a metal having relatively high tensile strength, but which is separated from the brittle metal cast about it.

I claim:

1. A method for making an internally reinforced crushing element of hard, brittle material which comprises forming a circumferentially continuous retaining structure of the general shape of said circumferential element from metal rods of high tensile strength, coating such retaining structure with a separating material to prevent fixed union of subsequently cast material with the retaining struuture, and thereafter casting normally hard brittle material circumferentially about and surrounding the retaining structure in the desired circumferential shape for the crushing element, with the coating preventing the circumferential retaining structure from directly contacting the cast material.

2. The method of claim 1 further characterized by and including the steps of forming the retaining structure from steel and employing as the cast material a metal brittle in the cast state and having a Brinnell hardness number as high as 400.

3. The method of claim 1 further characterized by and including the step of annealing the retaining structure to relieve stresses prior to the application of the coating.

4. The method of claim 1 further characterized in that the coating step includes heating the retaining structure and applying a mixture of powdered resin and sand while the retaining structure is hot enough to soften the resin so that the applied mixture is baked to a crust.

5. The method of claim 4 further characterized in that the mixture is applied by placing the retaining structure heated to a temperature of 250°–300° C. within the mixture and agitating the mixture and retaining structure until the coating is from 0.5 to 5 mm. thick, and baking within the range of 200° to 400° C.

6. The method of claim 5 further characterized by using a mixture of powdered resin and sand which is preponderantly sand of the order of fineness No. 110 A.F.S. with the balance phenolformaldehyde molding powder.

References Cited

UNITED STATES PATENTS

| | | | |
|---|---|---|---|
| 1,494,265 | 5/1924 | Martindale | 241—299 |
| 1,774,556 | 9/1930 | Jones | 241—299 X |
| 2,094,538 | 9/1937 | Ingersoll | 164—100 |
| 2,770,026 | 11/1956 | Petersilie et al. | 29—419 X |
| 2,997,784 | 8/1961 | Petrovich et al. | 29—527.3 X |
| 3,315,418 | 4/1967 | Zawodni et al. | 51—206 |
| 3,461,944 | 8/1969 | Kuebrich | 164—100 |

JOHN F. CAMPBELL, Primary Examiner

D. C. REILEY, Assistant Examiner

U.S. Cl. X.R.

51—206; 164—75, 76, 100; 241—299; 249—115